UNITED STATES PATENT OFFICE.

BENJAMIN T. BROOKS AND FRED W. PADGETT, OF PITTSBURGH, PENNSYLVANIA, ASSIGNORS TO GULF REFINING COMPANY, OF PITTSBURGH, PENNSYLVANIA, A CORPORATION OF TEXAS.

MANUFACTURE OF A NON-SAPONIFIABLE UNSATURATED HYDROCARBON OIL FROM A DRYING-OIL.

1,220,820.     Specification of Letters Patent.     Patented Mar. 27, 1917.

No Drawing.     Application filed August 10, 1914. Serial No. 855,982.

*To all whom it may concern:*

Be it known that we, BENJAMIN T. BROOKS and FRED W. PADGETT, both citizens of the United States, and residing at Pittsburgh, Allegheny county, State of Pennsylvania, have invented certain new and useful Improvements in the Manufacture of a Non-Saponifiable Unsaturated Hydrocarbon Oil from a Drying-Oil; and we do hereby declare the following to be a full, clear, and exact description of the invention, such as will enable others skilled in the art to which it appertains to make and use the same.

This invention relates to the production of an unsaturated, hydrocarbon oil from a drying oil, the resultant product having, as one of its principal uses the capacity of furnishing a suitable non-saponifiable substitute for linseed oil in the making up of paint compounds. The non-saponifiable character of the product permits it to be used to particular advantage in paint compounds intended for application to surfaces of concrete, cement, and the like, wherein the lime present exerts a saponifying action upon the oleaginous vehicle usually employed and tends to cause the applied layer of paint to peel off.

In accordance with the invention, the product may be obtained in a number of different ways. For instance, a lime salt or soap may be distilled, preferably *in vacuo* (say 20 m. m.), with free lime, in accordance with the equation:—

1. $(RCH_2CO_2)_2Ca + Ca(OH)_2 \rightarrow 2RCH_3 + 2CaCO_3$.

Or, an aqueous solution of an alkali soap (potash or soda soap) may be electrolyzed, according to the following equation:—

2. $RCH_2CO_2Na + H_2O \rightarrow RCH_3 + CO_2 + NaOH$.

Or, free linseed acids may be distilled and brought into contact with a catalyst (such as manganous oxid, ferric oxid, or alumina) at high temperatures, (as, for instance, 400° C. to 500° C.,) according to the equation:—

3. $RCH_2CO_2H \rightarrow RCH_3 + CO_2$.

In the three foregoing equations, the symbol R refers to a hydrocarbon radical containing 2 double bonds.

The product produced, in each of these instances, is an unsaturated hydrocarbon oil, which is non-saponifiable and non-volatile in the sense that it will suffer no appreciable evaporation loss until it sets to a hard film (such as is given by linseed oil) after it has absorbed oxygen from the air to the requisite amount.

While we have referred specifically to the manufacture of the product from linseed oil, it will be understood that it may also be produced from other drying oils such as china-wood oil, by similarly removing therefrom the acid or carbon dioxid group.

What we claim is:

1. The method of producing from drying oils unsaturated hydrocarbons having valuable film-forming properties which comprises splitting off carbon dioxid from the free fatty acids of said oils; substantially as described.

2. The method of producing from drying oils unsaturated hydrocarbons having valuable film-forming properties which comprises splitting off carbon dioxid from the free fatty acids of said oils by heating in the presence of a metal oxid; substantially as described.

3. The method of producing from linseed oil unsaturated hydrocarbons having valuable film-forming properties which comprises splitting off carbon dioxid from the free fatty acids of said oil; substantially as described.

4. As a new article of manufacture, an unsaturated hydrocarbon oil corresponding to the free fatty acids of a drying oil after the splitting off of carbon dioxid therefrom, said hydrocarbon oil having valuable film-forming properties and being a valuable substitute for linseed oil; substantially as described.

5. As a new article of manufacture, an unsaturated hydrocarbon oil corresponding to the free fatty acids of linseed oil after the splitting off of carbon dioxid therefrom, said hydrocarbon oil having valuable film-forming properties and being a valuable substitute for linseed oil; substantially as described.

In testimony whereof we affix our signatures, in presence of two witnesses.

BENJAMIN T. BROOKS.
FRED W. PADGETT.

Witnesses for B. T. Brooks:
DAVID B. DAY,
RUSSELL J. BURT.

Witnesses for Fred W. Padgett:
M. C. MOORE,
C. H. HARBISON.